US011351746B2

(12) United States Patent
Tsoupikov et al.

(10) Patent No.: US 11,351,746 B2
(45) Date of Patent: Jun. 7, 2022

(54) APPARATUS AND METHOD FOR MANUFACTURING GREEN TYRES

(71) Applicant: Intereuropean S.r.l., Milan (IT)

(72) Inventors: Vladislav Tsoupikov, Milan (IT); Marco Donzelli, Milan (IT)

(73) Assignee: INTEREUROPEAN S.R.L., Milan (IT)

( * ) Notice: Subject to any disclaimer, the term of this patent is extended or adjusted under 35 U.S.C. 154(b) by 279 days.

(21) Appl. No.: 16/463,902

(22) PCT Filed: Nov. 27, 2017

(86) PCT No.: PCT/IB2017/057421
§ 371 (c)(1),
(2) Date: May 24, 2019

(87) PCT Pub. No.: WO2018/096511
PCT Pub. Date: May 31, 2018

(65) Prior Publication Data
US 2019/0375173 A1    Dec. 12, 2019

(30) Foreign Application Priority Data
Nov. 28, 2016  (IT) ....................... 102016000119949

(51) Int. Cl.
*B29D 30/00*   (2006.01)
*B29D 30/26*   (2006.01)
*B29D 30/20*   (2006.01)

(52) U.S. Cl.
CPC ....... *B29D 30/005* (2013.01); *B29D 30/0016* (2013.01); *B29D 30/2607* (2013.01);
(Continued)

(58) Field of Classification Search
CPC .............. B29D 30/2607; B29D 30/005; B29D 2030/204; B29D 30/0016;
(Continued)

(56) References Cited

U.S. PATENT DOCUMENTS 4,126,506 A * 11/1978 Marosan ............ B29D 30/0016
156/396
4,204,903 A * 5/1980 Alexander ......... B29D 30/2607
414/223.01
(Continued)

FOREIGN PATENT DOCUMENTS

EP    0798104 A2    10/1997
EP    1295708 A2    3/2003
(Continued)

*Primary Examiner* — Robert C Dye
*Assistant Examiner* — Alexander D Booth
(74) *Attorney, Agent, or Firm* — Bookoff McAndrews, PLLC (57) ABSTRACT

An apparatus (10) for producing green tyres (13) consisting of a carcass or inner section (13') coupled with a belt package or outer section (13"), comprising a first tyre processing assembly (12) for manufacturing the carcass or inner section (13'), a second tyre processing assembly (14) for finishing said carcass (13'), a third tyre processing assembly (16) for manufacturing a belt package or outer section (13") and for coupling said carcass or inner section with said belt package or outer section (13', 13") to form a tyre (13), and an unloading station (60) for unloading said tyre (13), said tyre processing assemblies comprising interface means for transferring the product being manufactured from one tyre processing assembly to another one and for moving said product being processed internally to said individual tyre processing assemblies in a fully automatic manner.

15 Claims, 7 Drawing Sheets

(52) U.S. Cl.
CPC ............... *B29D 2030/0044* (2013.01); *B29D 2030/204* (2013.01); *B29D 2030/206* (2013.01)

(58) Field of Classification Search
CPC ........ B29D 2030/206; B29D 2030/207; B29D 2030/208; B29D 2030/202; B29D 30/20; B29D 2030/209; B29D 2030/205; B29D 2030/0038
USPC ........................ 156/394.1, 406.2, 111, 396
See application file for complete search history.

(56) References Cited

U.S. PATENT DOCUMENTS

| | | | | |
|---|---|---|---|---|
| 4,230,517 A | * | 10/1980 | Enders | B29D 30/00 156/126 |
| 4,402,782 A | * | 9/1983 | Klose | B29D 30/2607 156/408 |
| 4,618,303 A | * | 10/1986 | Irie | B29D 30/0016 425/38 |
| 4,732,640 A | * | 3/1988 | Goodfellow | B29D 30/0016 156/396 |
| 4,877,468 A | * | 10/1989 | Siegenthaler | B29C 48/0022 156/111 |
| 5,082,519 A | * | 1/1992 | Klose | B29D 30/0016 156/126 |
| 5,354,404 A | | 10/1994 | Benjamin | |
| 6,139,668 A | * | 10/2000 | Stokes | B29D 30/005 156/111 |
| 2006/0088405 A1 | * | 4/2006 | Leimbach | B65G 1/14 414/801 |
| 2009/0032175 A1 | * | 2/2009 | Tatara | B29D 30/20 156/111 |
| 2009/0133808 A1 | * | 5/2009 | Tatara | B29D 30/005 156/111 |
| 2009/0159183 A1 | * | 6/2009 | Currie | B29D 30/0016 156/111 |
| 2012/0024464 A1 | * | 2/2012 | Marchini | B29D 30/50 156/110.1 |
| 2014/0374026 A1 | | 12/2014 | Yuan et al. | |

FOREIGN PATENT DOCUMENTS

| | | |
|---|---|---|
| EP | 1481791 A2 | 12/2004 |
| EP | 1568475 A1 | 8/2005 |
| EP | 2746035 A1 | 6/2014 |
| RU | 2174469 C2 | 10/2001 |
| WO | WO2011077236 A1 | 6/2011 |
| WO | WO2013083071 A1 | 6/2013 |

* cited by examiner

APPARATUS AND METHOD FOR MANUFACTURING GREEN TYRES

TECHNICAL FIELD

The present invention refers to an apparatus and a method for manufacturing tyres.

BACKGROUND

More specifically, the present invention makes reference to an apparatus and to its respective method for a fully automated manufacturing and assembling of tyres.

It is known that tyres are manufactured starting from a mix of rubber formed of a plurality of different types of rubbers, fillers, and other additive components which are mixed in dedicated mixing machines the function of which is to form a homogeneous compound which is subsequently processed in grinding machines in which the cooled down rubber is further processed to obtain a semi-finished product wound on coils from which it is cut for obtaining strips which will be used to form the basic structure of a tyre, which is manufactured by proceeding from the inside to the outside of the structure of the tyre itself and, in particular, in accordance with such process, the fabric elements, the iron belt, the beads, the ply, the tread, and the remaining components are positioned, so as to obtain that which is referred to as a green tyre for a subsequent vulcanization and then a final inspection step.

More specifically, the tyre forming process, typically referred to as "tyre packing", is carried out by using rotary support drums and the following sequence of steps, which basically comprises three macro-steps consisting of manufacturing the carcass or inner section of the tyre, preparing the belt package or outer section, and assembling said inner section and outer section together.

The carcass or inner section forming process is implemented on a first drum and comprises the following steps:
  arranging two opposed and parallel, rubberized metal rings on a support suitable for coupling with the drum, said rings defining the so-called bead of the tyre;
  applying a synthetic rubber sheet or layer onto the drum, in the central zone thereof comprised between the two metal rings making up the bead;
  applying a rubberized textile film onto the synthetic rubber sheet with the purpose of implementing a radial reinforcement for the tyre;
  applying the two previously arranged rubberized metal rings onto a support against the shoulder of the drum;
  putting opposed air-inflated chambers on the drum with the purpose of turning up/over the rubber sheet in excess with respect to the rubberized metal rings on said rubberized metal rings;
  applying two opposed bands, also made from rubber or a similar material, suitable for making up the sidewalls of the tyres;
  folding the sidewall onto the bead;
  unloading the carcass or inner section from the first drum.

The belt package or outer section preparation process is implemented on a second drum and comprises the following steps:
  winding on the rotary drum first layers consisting of a rubber core provided with steel wires crossed with each other;
  applying a thin layer of rubberized nylon onto said rubber core;
  applying the tread layer onto the rubberized ply.

At this point, the third macro-step takes place, which consists of coupling the inner section with the outer section, such third macro-step comprising the following sequence of steps:
  transferring the carcass onto a third drum;
  transferring the belt package onto the same third drum;
  inflating the assembly thus obtained by compressed air to make the individual layers adhere to each other;
  processing the surface for making it adhere to the carcass or inner section;
  unloading the assembly thus obtained and making up the "green" tyre to be submitted to the subsequent processing steps.

The above-mentioned macro-steps and their respective sub-steps which make up them are traditionally carried out by way of manual or semi-automatic processes.

In particular, the steps of loading the rubberized metal rings of the bead onto the first drum, unloading the carcass or inner section from the first drum, and loading it onto the third drum, are carried out manually by an operator.

The step of unloading the outer section from the second drum in order for it to be assembled together with the inner section on the third drum is carried out automatically by means of a transferring means.

Likewise, the step of unloading the green tyre from the third drum is carried out manually by an operator.

Some known processes for manufacturing tyres are described in documents such as, for instance, EP1295708, which makes reference to the assembling of a component part of tyres and, more specifically, beads, document EP1481791, which makes reference to an apparatus aiming at manufacturing tyres along a simultaneous production line which comprises a first assembling line which forms the carcasses of the tyres and a second assembling line which forms the remaining part of the tyre which, thus formed, is subsequently sent/transferred to a mould and is subsequently vulcanized.

Other known solutions are described, for instance, in U.S. Pat. No. 2,354,404, which describes an automatic process suitable for manufacturing a complete structure of a tyre by way of one two-stage machine or, also, in WO2011/077236 which describes a process for forming a tyre manufactured by way of a plant that comprises a first workstation and a second workstation each suitable for manufacturing a portion of structural components of the tyre, which are subsequently assembled with each other.

Another know solution is disclosed in US2014/0374026 as a triple-drum forming machine for tire billet comprising an overhead portal frame structure aimed to the preparation and conveying process of a tyre body component and a belted layer-tread component defined by a tire body transfer ring component and a belted layer transfer ring conveyed in a sliding manner along a top portal frame so as to allow air assembly operation leaving a free ground.

However, the traditional processes for manufacturing tyres as described above feature a number of major drawbacks bound to the fact that the above-described processing steps are performed manually or semi-automatically and, in any case, there is always an operator who is in charge of placing rubberized metal rings onto the drum, unloading the carcass formed in the first macro-step, and transferring it to the workstations downstream in order for it to be assembled together with the outer layers, and unloading the green tyre from the workstations, if any (provided said unloading step is not performed automatically).

Therefore, the times spent in unloading the pre-assembled products and in transferring them from one station to the other are much bound to the operator's speed, physical condition, and accuracy in performing said operations and, in any case, they can vary over the day (in fact an operator cannot guarantee a high repeatability).

For these reasons, the assembling process entails long production times and consequently high production costs.

A further drawback is bound to the fact that during the above considered manual steps, the individual machines are not in movement, which contributes to extend the production times.

A further drawback is bound to issues of safety for the operator, who cannot guarantee for certain the utmost attention during his/her work shift and, consequently, risks of accidents or similar complications can arise. In addition to what considered above with reference to safety, the traditional tyre assembling processes (for producing green tyres) can be affected by problems bound to a high number of rejects caused by positioning errors or the like made by the operator.

A further and important drawback is bound to the fact that the conventional apparatuses used for manufacturing tyres require a storage area suitable for temporarily storing the pre-assembled products, i.e. the inner sections of the tyre, before coupling them with the outer part or belt package; this also results in extending the production times and, consequently, the costs related thereto.

In order to overcome such drawbacks, some known solutions are used to manufacture tyres in fully automated plants wherein the operator performs control functions.

However, such solutions also entail major drawbacks bound to the fact that the tyre technology has to be modified for implementing them, such technology becoming more complex with respect to that which characterizes a traditional tyre, such different tyre technology determining, as a consequence, a process and, consequently, a manufacturing apparatus less flexible, more complex, and not usable for traditional tyres.

SUMMARY

An object of the present invention is to obviate the above-mentioned drawbacks.

More specifically, an object of the present invention is to provide an apparatus and a method for manufacturing tyres in a fully automatic manner and without requiring an operator being present during the positioning, unloading, transferring, and similar steps.

A further object of the present invention is to provide an apparatus for manufacturing "green" tyres and a related process suitable for reducing the cycle downtimes and consequently the production costs.

A further object of the present invention is to provide an apparatus and a method that allow to optimize the production cycle while assuring a high degree of repeatability and, consequently, suitable for substantially reducing the number of finished products (green tyres) that are rejected because of their assembling defects.

A further object of the present invention is to provide an apparatus for manufacturing tyres that does not require any modifications in the operating steps that characterize the traditional assembling processes.

A further object of the present invention is to put at the user's disposal an apparatus and a method for manufacturing tyres suitable for providing a high level of strength and reliability over time and also such as to be easily and cost-effectively implemented.

These objects and others are achieved by the invention that features the characteristics according to claim 1.

According to the invention, there is provided an apparatus for manufacturing green tyres obtained by coupling a carcass or inner section with a belt package or outer section, which comprises a first tyre processing assembly for manufacturing the carcass or inner section, a second tyre processing assembly for finishing said carcass, a third tyre processing assembly for manufacturing a belt package or outer section and for coupling said carcass or inner section with said belt package or outer section to form a tyre, and an unloading station for said tyre, said tyre processing assembly comprising interface means for transferring the product being manufactured from one tyre processing assembly to another one and for fully automatically handling said product being manufactured internally to said individual tyre processing assemblies.

Advantageous embodiments of the invention are apparent from the dependent claims.

BRIEF DESCRIPTION OF THE DRAWING FIGURES

The constructional and functional characteristics of the apparatus and of the method for manufacturing tyres according to the present invention can be better understood from the detailed description which follows, wherein reference is made to the attached drawings which illustrate one embodiment thereof, which is provided for explanatory, non-limitative, purposes only, and wherein.

DETAILED DESCRIPTION OF THE INVENTION

With reference to the mentioned figures, the apparatus for manufacturing tyres according to the present invention, identified by the reference numeral 10 as a whole, comprises three tyre processing macro-assemblies, consisting of a first assembly 12, a second assembly 14, and a third assembly 16 respectively, arranged sequentially one after the other.

In particular, the first assembly 12 comprises the workstations suitable for manufacturing the carcass or inner section of a tyre, the second assembly 14 comprises the inner section or carcass finishing station, and the third assembly 16 comprises the workstations suitable for manufacturing the belt package or outer section of a tyre, and workstations suitable for assembling said carcass or inner section with the belt package or outer section and the stations suitable for controlling the unloading of an assembled tyre identified by the reference numeral 13.

The first assembly 12 comprises a first feeding station 18 suitable for feeding a synthetic rubber sheet or layer and a textile film layer on a drum 20 as described in more details below (the component parts of such station are not here described in details because they are already known), a loading station 21 for loading rubberized metal rings 25 suitable for making up the beads, a drum slave station 26, and a drum support and transfer station 27.

In particular, said feeding station 18 comprises conveyor belts 22 and 22', dedicated to unwinding and cutting to measure the rubber layer and the rubberized textile film respectively, said two rubber-composing element which, as better explained below, are arranged sequentially according to a direction tangent to the lateral surface of the drum, the application tapes 23 and 23' (for the rubber layer and rubberized textile film respectively) being positioned above the drum 20.

The loading station 21 suitable for loading the rubberized metal rings 25 on supports suitable for coupling with the drum 20 comprises a handler 28 consisting of an anthropomorphic robot the function of which is to position a pair of opposed and parallel rubberized metal rings 25, picked up from a rubberized metal ring store (not shown in the figures), on said supports, said rubberized metal rings making up the bead of a tyre, as better detailed below.

The drum support and transfer station 27 comprises a turret 29 revolving about a vertical axis and supporting two opposed cylindrically shaped and horizontally arranged drums 20, said drums 20 being secured to a tailstock 31, movable in an axial direction, said drums being rotatably secured to said turret 29 and driven into rotation about their axis by way of motor-driving elements arranged internally to the turret 29; this in order to drive the drum 20 into rotation according to what described below.

The drum slave station 26 comprises a head 26' suitable for coaxially coupling with the drum 20 and is supported by a block 26" capable of translatorily moving so as to get closer to/move away from the drum 20 secured to the turret 29, along a horizontal guide 30.

The head 26' of the drum slave station 26 and the tailstock 31 of the turret 29 of the drum support and transfer station 27 comprise each a chamber (not shown in the figure) which is air-inflatable and suitable for being put on the drum 20, with the function of turning the excess sheet over the rubberized metal ring.

The second assembly 14 comprises a second feeding station 32, not described in details because already known, suitable for feeding, on the drum coming from the first assembly 12 and supporting the carcass or inner section formed in said first assembly, opposed bands 33 made from rubber or a similar material suitable for making up the sidewalls of the tyre; said second feeding station 32 also comprises two opposed folding devices 34 the function of which is to operate onto the rubber bands 33 which make up the sidewalls in order to fold them over the bead of the tyre.

Figure 1:
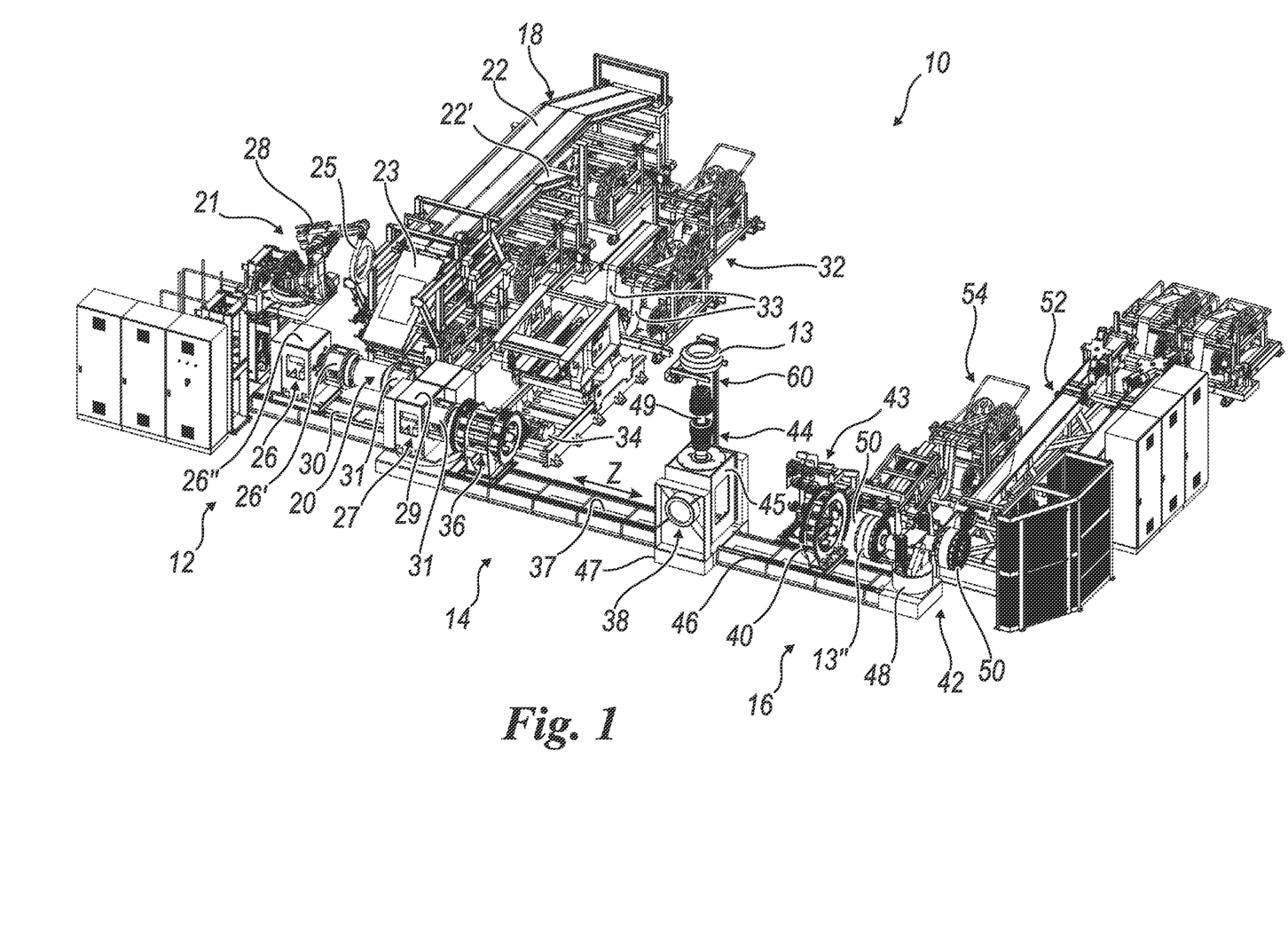
FIG. 1 schematically shows an axonometric top view of the apparatus for manufacturing tyres according to the invention.

The second assembly 14 also comprises a transfer element 36 translatable along guides 37 (according to the direction indicated by the arrow Z in FIG. 1) to move the complete carcass or inner section of the tyre in the direction of a third tyre processing assembly, where said inner section will be assembled together with an outer section.

The third assembly 16 comprises a transfer device 38, a coupling device 40 for coupling the inner section with the outer section of the tyre, a forming station 42 for forming the outer section of the tyre, and a finishing station 43 for finishing the assembled tyre.

The transfer device 38 comprises an arm 44 rotatable movable between the second assembly 14 and the third assembly 16 and suitable for transferring the carcass or inner section 13' of the tyre 13 from the second tyre processing assembly to the third tyre processing assembly.

The movable arm 44 comprises a base 45 rotatable about a support frame 47, a shaft 49 being secured to said base 45. The coupling device 40 comprises a movable ring structure translatable with respect to guides 46 and performing the function of coupling the carcass or inner section 13' with the belt package or outer section 13" of the tyre 13, as better detailed below.

The forming station 42 used to form the belt package or outer section 13" of the tyre 13 comprises a further turret 48 revolving about a vertical axis of rotation and provided with further two opposed drums 50 rotatable about a horizontal axis.

The function of said further turret 48 is to move, in a reciprocating manner, the further drums 50 between a first station 52 in which first layers consisting of a rubber core provided with steel wires and subsequently thin layers of rubber ply (placed on said core) are put down onto the rotary drum, and a second station 54 in which the tread is applied.

The finishing station 43 used to finish the assembled tyre, not described in details because already known, comprises rollers suitable for processing the sidewall of the tread of the belt package or outer section 13" of the tyre 13 to make it adhere to the shoulder of the carcass or inner section 13'.

The apparatus 10 also comprises an unloading station 60 for unloading the assembled tyre 13, said unloading station being arranged in correspondence with the transfer device 38 and, more specifically, above it.

The apparatus according to the invention is provided with a control panel which makes up an operator interface interfacing to a control unit and allows for the operator to display and set the manufacturing steps, to monitor the work cycle, and to modify the processing parameters as a function of the data coming from sensors.

The operation of the apparatus for manufacturing tyres according to the present invention, as described above in details with reference to its component parts, is described below.

Figure 2:
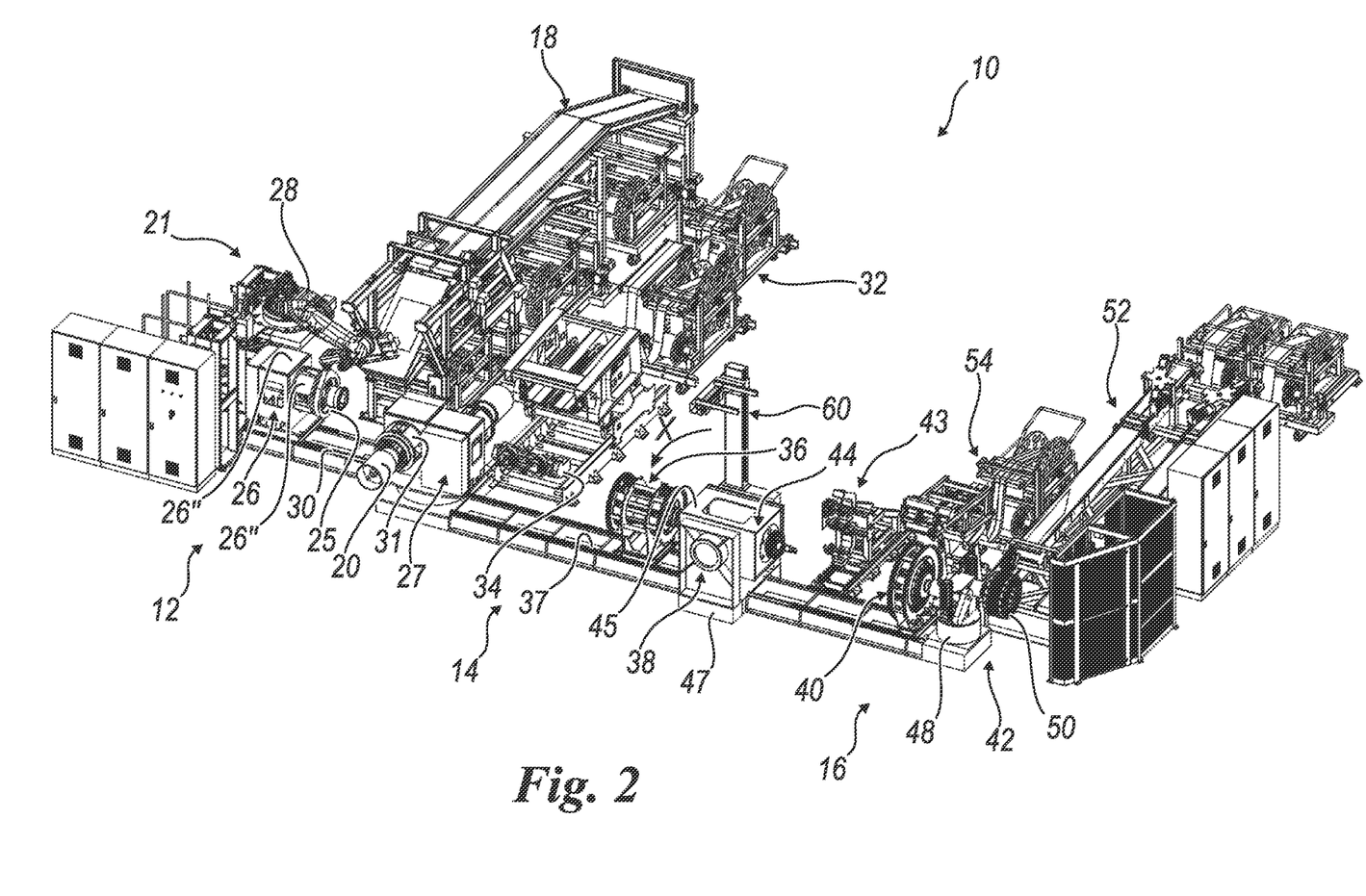
FIG. 2 thru 7 schematically show, in an axonometric top view, the sequence of the operating steps carried out on the apparatus according to the invention for manufacturing tyres.
Figure 3:
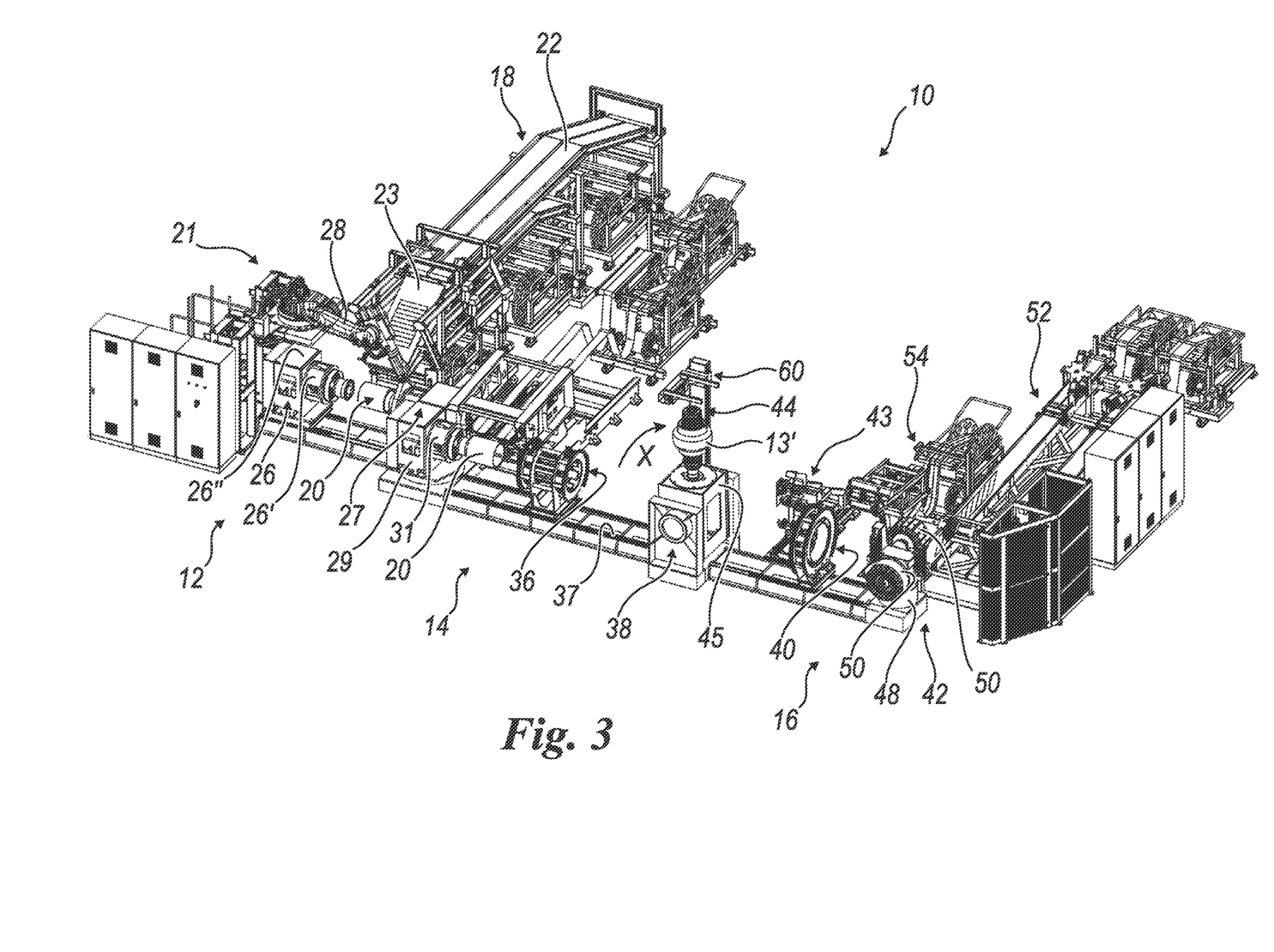
Figure 4:
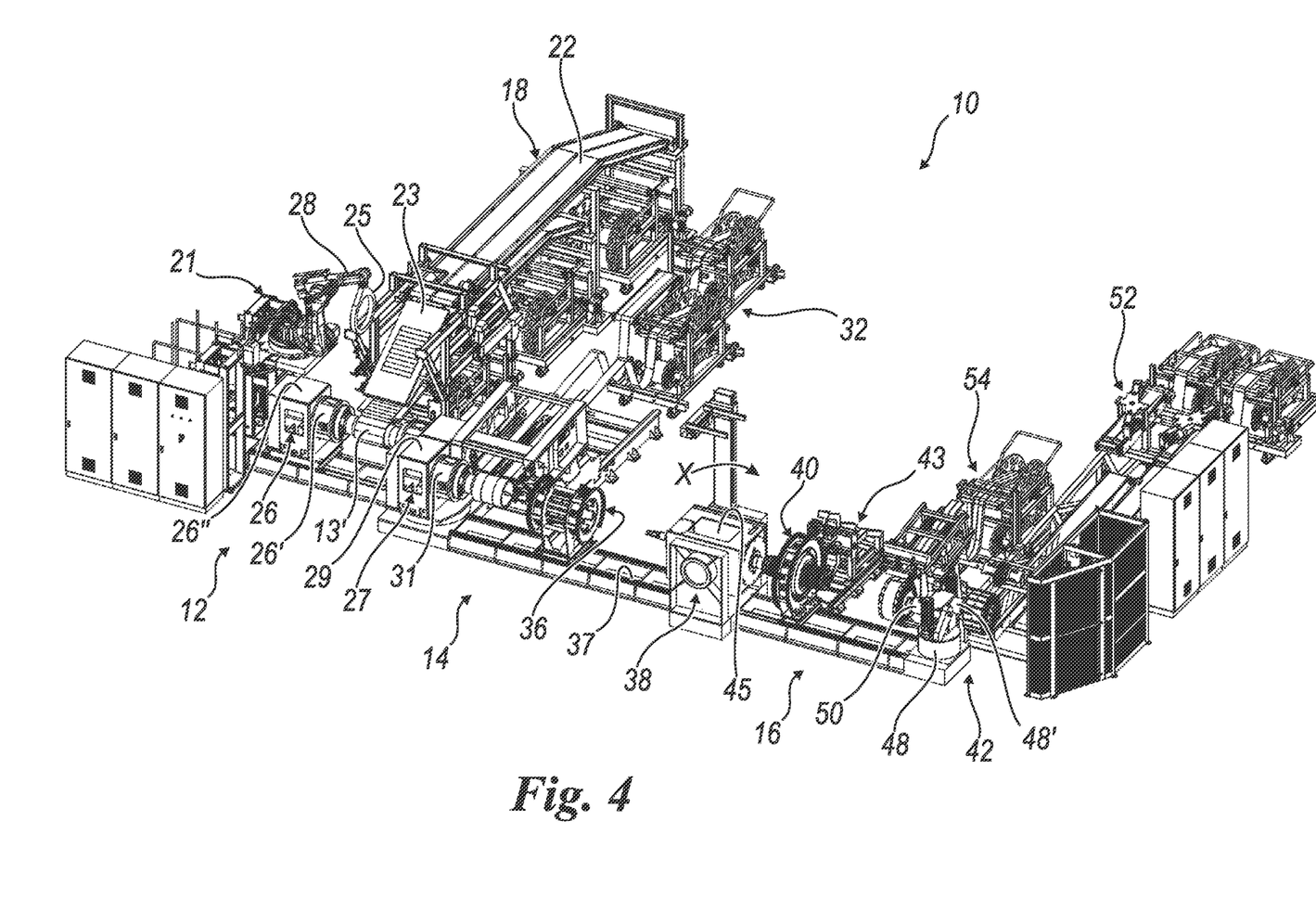
Figure 5:
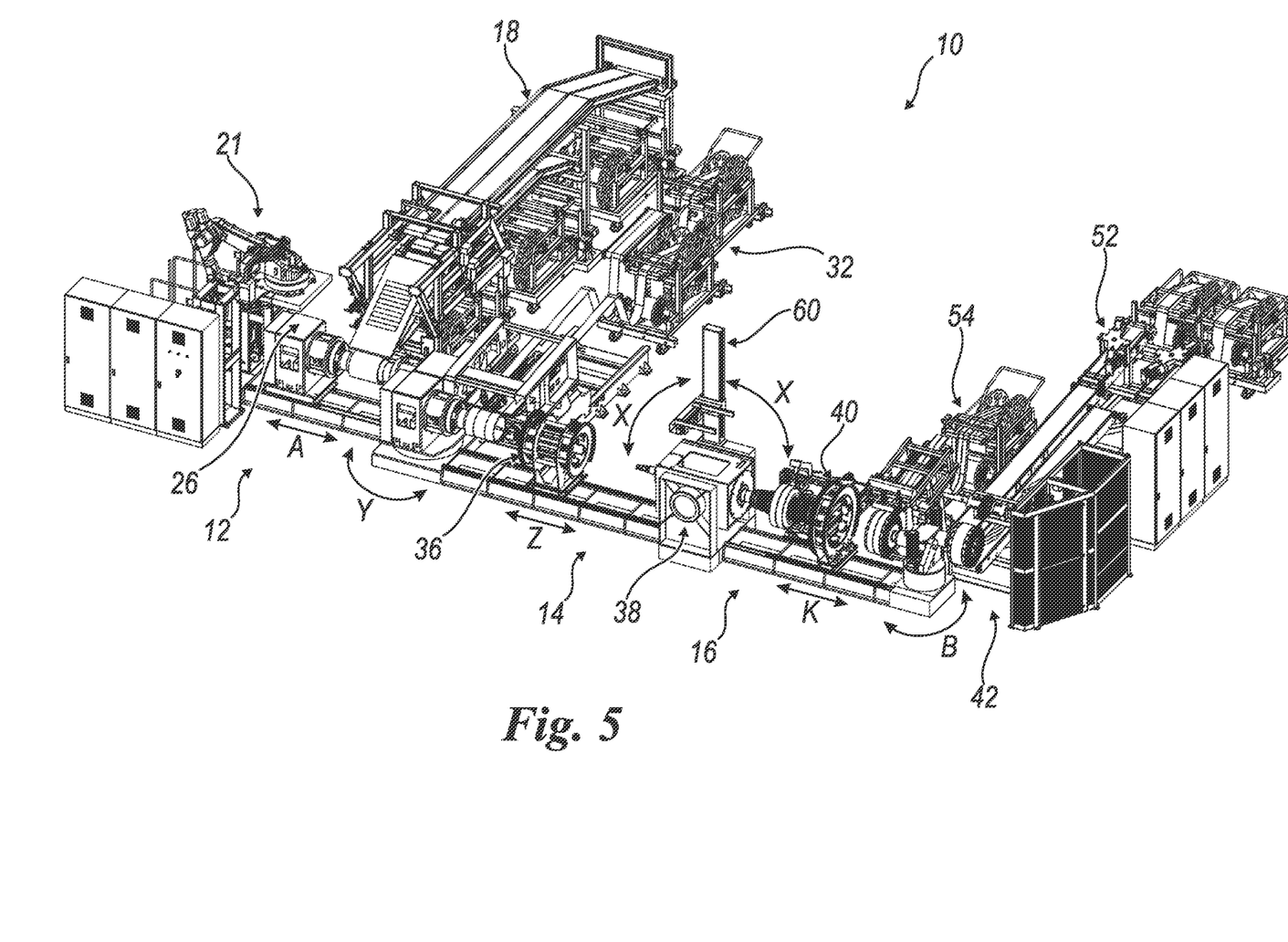
Figure 6:
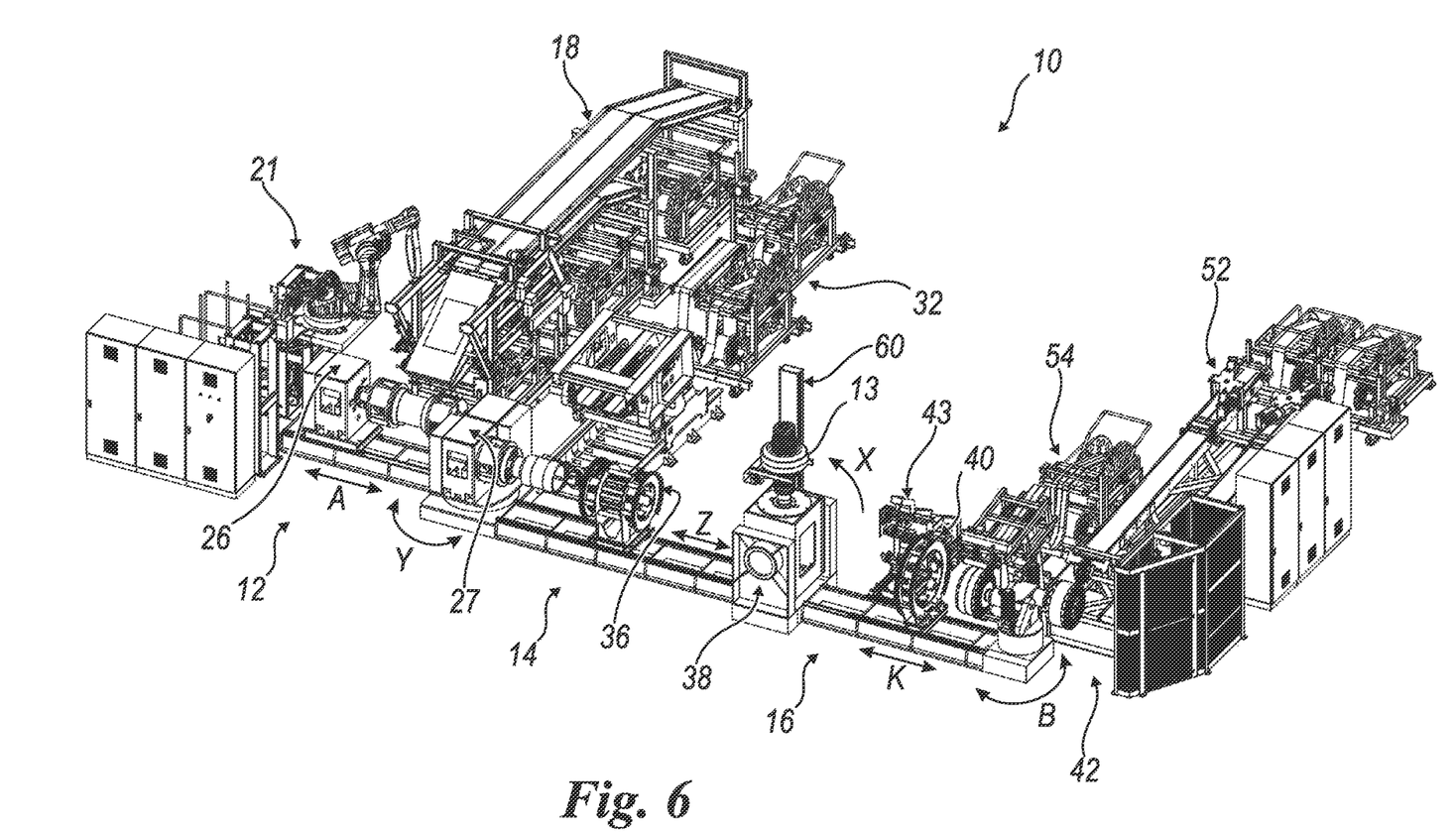

In the first assembly 12 of the apparatus 10, a first part of the carcass or inner section 13' of the tyre 13 is formed according to the following operating steps:

the turret 29 is driven into rotation (arrow Y in FIG. 5) to position together with one of the drums 20 coaxially to the head 26' of the drum slave station 26 (FIG. 3);

the handler 28 in the station 21 puts a first rubberized metal ring 25 on the tailstock 31 of the turret 29 and a second rubberized metal ring 25, opposed to the first rubberized metal ring, is put on the head 26' of the drum slave station 26, said rubberized metal rings being suitable for making up the bead of the tyre 13 (FIGS. 2 and 3);

the drum slave station 26 is then driven into translation along the guides 30 (the block 26" supporting the head 26' is made translatorily move) so that the head 26' gets in contact with the drum 20 coaxially thereto (FIG. 4 and arrow A in FIG. 5);

the drum 20 thus supported, is driven into rotation and first a sheet layer or a rubber layer and subsequently a textile film are wound thereabout, in its central portion (FIG. 4 and FIG. 5);

once the mentioned sheet layers and the textile film are placed, the head 26' and the tailstock 31 reciprocally move forward one with respect to the other to put the rubberized metal rings supported by them against the shoulder of the drum 20 (FIG. 6);

once the rubberized metal rings are placed, the opposed chambers are air-inflated in order to turn the rubber sheet in excess with respect to the rubberized metal rings up/over said rubberized metal rings themselves;

the head 26' and the tailstock 31 move away one from the other and the head 26' disengages from the drum.

At this point the turret 29 in the drum support and transfer station 27 rotates about its own vertical axis (a 180° rotation as indicated by the arrow Y in FIG. 5) to bring the drum 20 provided with the first part of the carcass of the tyre in correspondence with the second tyre processing assembly 14 (FIG. 2 and FIG. 3); the turret being in this position, the handler 28 is operated to position the rubberized metal rings 25 as described above.

Figure 7:
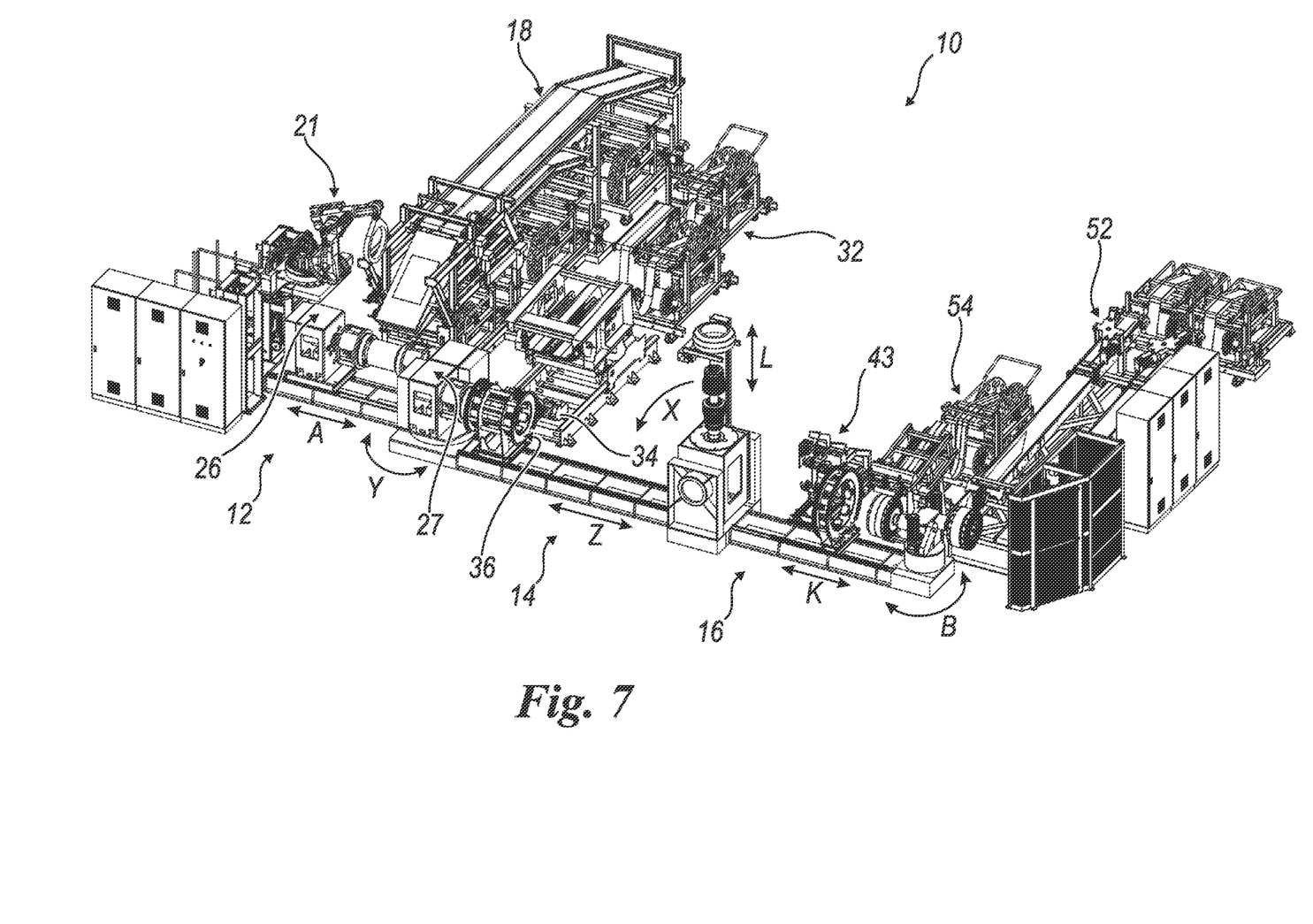

In the second tyre processing assembly 14, the structure of the carcass or inner section 13' of the tyre 13 is completed according to the following operating steps:

the drum 20 is positioned by the turret 29 in the support and transfer station 27 in correspondence with the second feeding station 32 which, the drum being driven into rotation about its own axis, deposits opposed bands 33 made from rubber or a similar material on the outer edges of the carcass being formed in order to make up the sidewalls of the tyre (FIG. 3 and FIG. 4);

the two opposed folding devices 34 are operated to fold the sidewalls over the bead of the tyre;

the transfer element 36 translatorily moves along the guides 37 (as indicated by the arrow Z in FIG. 5), to coaxially and externally put itself on the drum 20 (FIG. 7) and grips the carcass 13' and transfers it to the third tyre processing assembly 16; in particular, the transfer element 36 moves the carcass 13' in the direction of the transfer device 38 and positions it on the movable arm 44 of said transfer device (FIG. 2), the base 45 of the transfer device 38 is operated to make the shaft 44 rotate (a 180° rotation as indicated by the arrows X in FIG. 5) and to position it in correspondence with the third tyre processing assembly 16.

The third tyre processing assembly is in charge of forming the belt package or outer section 13" of the tyre 13 and of coupling it with the carcass or inner section 13' coming from the second assembly 14.

More specifically, in the forming station 42 the belt package or outer section 13" of the tyre is manufactured and, in particular, the further turret 48, by rotating about a vertical axis of rotation (as indicated by the arrow B in FIG. 5) positions the further two opposed drums 50, in a reciprocating manner, in correspondence with the first station 52 in which the first layers consisting of a rubber core provided with steel wires braided with each other and subsequently thin strips of rubberized nylon (placed on said core) are deposit onto the drum 50, and with a second station 54, in which the tread is applied.

Considering the sequence of the steps, initially the first station 52 places the first layers consisting of a rubber core provided with steel wires braided with each other on the drum 50 and, subsequently, the thin strips of rubberized nylon and, subsequently, the turret 48 rotates (a 180° rotation according to the direction indicated by the arrow B in FIG. 5) and positions the drum 50 in correspondence with the second station 54, in which the tread layer is applied.

At this point, in the third tyre processing assembly the following operating steps are carried out:

the base 45 of the transfer device 38 rotates and arranges the arm 44 according to a horizontal direction coaxial to the drum 50;

the coupling device 40 translatorily moves along the guides 46 (as indicated by the arrows K in FIG. 5), thus superimposing to the drum 50 which supports the belt package or outer section 13" formed (i.e. also comprising the tread), pick up it from the drum 50, and translatory moves in the direction of the shaft 44;

the coupling device 40 coaxially puts itself on the shaft 44 so as to superimpose the belt package or outer section 13" onto the carcass or inner section 13', said two parts being made adhere to each other thanks to the compressed air inflating action exerted by the inner section onto the outer section;

the coupling device 40, being empty, translatorily moves in the direction of the drum 50 of the forming station 42 to pick up a new belt package or outer section 13";

at the finishing station 43, the assembly consisting of the carcass or inner section 13' and the belt package or outer section 13" is processed by means of rollers which press the lateral edge of the tread of the belt package or outer section 13" to make it adhere to the shoulder of the carcass or inner section 13' to form the tyre 13;

the base 45 of the transfer device 38 rotates by 90° thus positioning the arm 44 in a vertical direction in correspondence with the unloading station 60, where the tyre 13 is picked up and moved towards the subsequent processing steps.

It is worth pointing out that the operating steps performed by the three tyre processing assemblies are not performed sequentially, but rather in masked time.

More specifically, whenever the opposed sidewalls are deposited onto the first part of the carcass or inner section 13' in the second tyre processing assembly 14, in the first tyre processing assembly 12 the feeding station 18 manufactures the first part of the carcass or inner section 13' and, simultaneously, the third tyre processing assembly 16 forms the belt package or outer section 13" and assembles it with a previously formed inner section 13' coming from the second tyre processing assembly 14.

All movements of the different stations and devices in the three tyre processing assemblies are synchronized and controlled by a central unit which processes the data coming from different sensors for an optimum control of the work cycle.

Evident are the advantages that the apparatus according to the invention and its respective method achieve, as it can be inferred from the foregoing.

The apparatus for manufacturing tyres according to the present invention advantageously makes it possible to form a green tyre 13, manufactured by assembling a carcass or inner section 13' and a belt package or outer section 13", in a fully automatic manner and without requiring a manual intervention by an operator who, in this case, just performs a work cycle monitoring and control function.

A further advantage consists in that the apparatus according to the invention makes it possible to eliminate the downtimes that are characteristic of the traditional manufacturing method, by implementing a cycle time basically not exceeding 35 seconds for manufacturing one green tyre; in accordance with the traditional manufacturing method, the cycle time is at least 1 minute per tyre.

Further advantageous is the fact that reducing the cycle time results in a consequent and related reduction in the production costs.

A further advantage of the present invention consists in that the apparatus and its respective method are interchangeable with the traditional production methods; as a matter of fact, the devices used in the present invention to form the inner section or carcass and the outer section or belt package, and to assemble them in order to form a tyre are the same as used in the traditional production processes.

Although the invention has been described above with a special reference to one embodiment thereof, which is provided for explanatory non-limitative purposes only, numerous modifications and variants will be apparent to a person skilled in the art in the light of the above description. Therefore, the present invention aims at embracing all modifications and variants that fall in the scope of the following claims.

The invention claimed is:

1. An apparatus (10) for manufacturing green tyres (13) consisting of a carcass or inner section (13') coupled with a belt package or outer section (13"), comprising:
    a first tyre processing assembly (12) for manufacturing the carcass or inner section (13'), the first tyre processing assembly (12) including a first guide (30);
    a second tyre processing assembly (14) for finishing said carcass or inner section (13'), the second tyre processing assembly (14) including a second guide (37) positioned adjacent to the first guide (30);
    a third tyre processing assembly (16) for manufacturing the belt package or outer section (13") and for coupling said carcass or inner section with said belt package or outer section (13', 13") to form a tyre (13), the third tyre processing assembly (16) including a third guide (46) extending from the second guide (37); and
    an unloading station (60) for unloading said tyre (13),
    the first tyre processing assembly (12) comprising a drum slave station (26) movably coupled to the first guide (30) and configured to engage a drum (20) upon translating along the first guide (30) toward a drum support and transfer station (27), the drum support and transfer station (27) is configured for transferring the drum (20) from the first guide (30) of the first tyre processing assembly (12) to the second guide (37) of the second tyre processing assembly (14) upon the drum slave station (26) disengaging the drum (20);
    the second tyre processing assembly (14) comprising a transfer element (36) movably coupled to the second guide (37) and configured to surround the drum (20) within the transfer element (36) upon translating along the second guide (37) toward the drum support and transfer station (27), and position the carcass or inner section (13') onto a transfer device (38) upon translating along the second guide (37) towards the third tyre processing assembly (16), and
    said third tyre processing assembly (16) comprising the transfer device (38) movably coupled to the third guide (46) and configured to move the carcass or inner section (13') toward the belt package or outer section (13") upon translating along the third guide (46), the transfer device (38) comprising a movable arm (44) that rotates the carcass or inner section (13') as the transfer device (38) translates between the second tyre processing assembly (14) and the third tyre processing assembly (16) for transferring the carcass or inner section (13') of the tyre (13) from the second tyre processing assembly (14) to the third tyre processing assembly (16) and to the unloading station (60), said drum support and transfer station (27), transfer element (36), and transfer device (38) co-operating for a fully automatic handling of said tyre (13) being processed internally to said individual tyre processing assemblies.

2. The apparatus according to claim 1, wherein the first tyre processing assembly (12) comprises a first feeding station (18) suitable for feeding a synthetic rubber sheet or layer and a textile film layer onto the drum (20), a loading station (21) for loading rubberized metal rings (25) making up a bead of the tyre (13), said station comprising a handler (28) suitable for handling said rubberized metal rings (25), the drum slave station (26) translatorily movable along the first guide (30), and the drum support and transfer station (27) rotatable about a vertical axis.

3. The apparatus according to claim 2, characterized in that the drum slave station (26) comprises a block (26") with respect to which there is secured a head (26') suitable for coaxially coupling with the drum (20) and movable according to an axial direction so as to get closer to/move away from the drum (20) which is rotatably supported on the drum support and transfer station (27).

4. The apparatus according to claim 1, the drum support and transfer station (27) comprises a turret (29) revolving around a vertical axis, supporting a pair of opposed drums (20) and provided with a pair of opposed tailstocks (31) coaxial to said drums (20) and movable in an axial direction so as to get closer to/move away from the drum (20) for a co-operation with a head (26') in the drum slave station (26).

5. The apparatus according claim 1, wherein the second tyre processing assembly (14) comprises a second feeding station (32) suitable for feeding, on a first part of the carcass or inner section (13') formed on the drum (20) supported by the drum support and transfer station (27), opposed bands (33) made from rubber arranged laterally to the carcass to form sidewalls of the tyre, and the transfer element (36) which is translatorily movable along the second guide (37) for moving a complete carcass or inner section (13') in the direction of the third tyre processing assembly (16).

6. The apparatus according claim 1, wherein the third tyre processing assembly (16) comprises
    the transfer device (38),
    a coupling device (40) for coupling the carcass or inner section (13') with the belt package or outer section (13") of the tyre (13), wherein the transfer device (38) is translatorily movable along the third guide (46),
    a forming station (42) for forming the outer section (13") of the tyre, and
    a finishing station (43) for finishing the assembled tyre, the forming station (42) used to form said belt package or outer section (13") comprising a further turret (48) revolving around a vertical axis of rotation and provided with further two opposed drums (50) rotatable about a horizontal axis, said turret being suitable for moving said further drums (50) between a first station (52), which makes up, on the drum (50), a rubber core provided with steel wires and thin strips of rubberized ply, and a second station (54) where a tread is applied.

7. The apparatus according to claim 1, further comprising a control panel which makes up an operator interface interfacing to a control unit and allows for an operator to display and set production steps, to monitor and control a work cycle, and to modify processing parameters as a function of signals coming from sensors.

8. A method for the automated manufacturing of tyres (13) implemented in accordance with the apparatus according to claim 1, characterized in that it comprises the following operating steps:
    manufacturing a first part of the carcass or inner section (13') in the first tyre processing assembly (12);
    transferring said first part of the carcass or inner section (13') to the second tyre processing assembly (14) in order to complete said carcass or inner section (13');
    transferring said carcass or inner section (13') to the third tyre processing assembly (16) for its coupling with the belt package or outer section (13") to form the tyre (13), said belt package or outer section (13") being formed in a forming station (42) in said third tyre processing assembly (16);

unloading the thus formed tyre (13) in the unloading station (60);

said operating steps being performed synchronously and in masked time.

9. The method according to claim 8, characterized in that:

during the step of forming the first part of the carcass or inner section (13') in the first tyre processing assembly (12), in the second tyre processing assembly (14) the formation of a partial carcass or inner section (13') coming from the first tyre processing assembly is completed, and said carcass is transferred to the third tyre processing assembly (16) in which the formation of the belt package or outer section (13") is in progress;

while the belt package or outer section (13") is assembled with the carcass or inner section (13') to form the tyre (13) in the third tyre processing assembly (16), in the second tyre processing assembly a new carcass or inner section (13') is being completed, and in the first tyre processing assembly (12) the formation of a first part of the new carcass or inner section (13') is in progress;

while the tyre (13) is being transferred from the third tyre processing assembly (16) to the unloading station (60), in the first tyre processing assembly (12) the first part of the carcass or inner section (13') is being completed, in the second tyre processing assembly a carcass or inner section (13') is completed, and in the third tyre processing assembly the formation of the belt package or outer section (13") is in progress.

10. The method according to claims 8, characterized in that the transfer of the carcass or inner section (13') from the first tyre processing assembly to the tyre assembly takes place by way of a 180° rotation about a vertical axis in the drum support and transfer station (27), the transfer from the second tyre processing assembly (14) to the third tyre processing assembly is by way of a translatory movement of the transfer element (36) which puts the carcass or inner section (13') on the transfer device (38) which performs a 180° rotation about a horizontal axis, and the transfer of the tyre (13) to the unloading station (60) is performed by way of a 90° rotation of the transfer device (38).

11. The apparatus according to claim 6, wherein the movable arm (44) is rotatable about a vertical axis that is perpendicular to a horizontal axis of the third guide (46) as the transfer device (38) translates between the second tyre processing assembly (14) and the third tyre processing assembly (16).

12. The apparatus according to claim 11, characterized in that the movable arm (44) comprises a base (45) rotatable about a support frame (47) in the vertical axis with respect to the horizontal axis and a shaft (49) being secured to said base (45).

13. The apparatus according to claim 3, wherein each head (26') of the drum slave station (26) and the tailstock (31) of the turret (29) of the drum support and transfer station (27) comprise a chamber positioned on the drum (20).

14. The apparatus according to claim 13, wherein each of the chambers is inflatable.

15. The apparatus according to claim 14, wherein the head (26') and the tailstock (31) are configured to turn excess amounts of a synthetic rubber sheet or layer and a textile film layer over a rubberized metal ring (25).

* * * * *